United States Patent
Pai et al.

(10) Patent No.: US 7,170,763 B2
(45) Date of Patent: Jan. 30, 2007

(54) APPARATUS AND METHOD FOR CONSTANT DELTA CURRENT CONTROL IN A CAPACITOR CHARGER

(75) Inventors: Chung-Lung Pai, Taipei (TW);
Kwan-Jen Chu, Hsinchu (TW);
Chun-Yen Huang, Jhubei (TW);
Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/010,357

(22) Filed: Dec. 14, 2004

(65) Prior Publication Data

US 2005/0134235 A1    Jun. 23, 2005

(30) Foreign Application Priority Data

Dec. 18, 2003   (TW) ............................. 92136060 A (51) Int. Cl.
*H02M 3/335* (2006.01)
(52) U.S. Cl. .................. 363/21.16; 363/19; 320/140
(58) Field of Classification Search ........ 323/282–286, 323/224, 299, 222, 207; 315/307, 247, 224, 315/244; 320/140, 166
See application file for complete search history.

(56) References Cited

U.S. PATENT DOCUMENTS

| | | | | |
|---|---|---|---|---|
| 5,640,312 A | * | 6/1997 | Carroll | 363/21.07 |
| 6,112,079 A | * | 8/2000 | Lamb | 455/411 |
| 6,288,501 B1 | * | 9/2001 | Nakamura et al. | 315/307 |

FOREIGN PATENT DOCUMENTS

| | | |
|---|---|---|
| JP | 2-276472 | 11/1990 |
| JP | 6-153496 | 5/1994 |
| JP | 2001-339258 | 12/2001 |
| JP | 2003-284329 | 10/2003 |

\* cited by examiner

*Primary Examiner*—Rajnikant B. Patel
(74) *Attorney, Agent, or Firm*—Rosenberg, Klein & Lee (57) ABSTRACT

In a capacitor charger, a transformer has a primary winding connected between an input voltage and a switch for generating a primary current flowing through the primary winding by switching the switch to thereby induce a secondary current flowing through a secondary winding of the transformer and a secondary voltage tapered from the secondary winding, a control apparatus and method adjusts the on-time period for the switch in response to the input voltage. The charging time and charging current are independent of the input voltage, and there is no power loss resulted from current sense to the primary current.

20 Claims, 5 Drawing Sheets

APPARATUS AND METHOD FOR CONSTANT DELTA CURRENT CONTROL IN A CAPACITOR CHARGER

FIELD OF THE INVENTION

The present invention is related generally to a capacitor charger, and more particularly, to an apparatus and method for constant delta current control in a capacitor charger. As generally used in the art, the term "delta current" is referred hereinafter to the difference between the maximum and minimum in the desired range of a current.

BACKGROUND OF THE INVENTION

Figure 1:
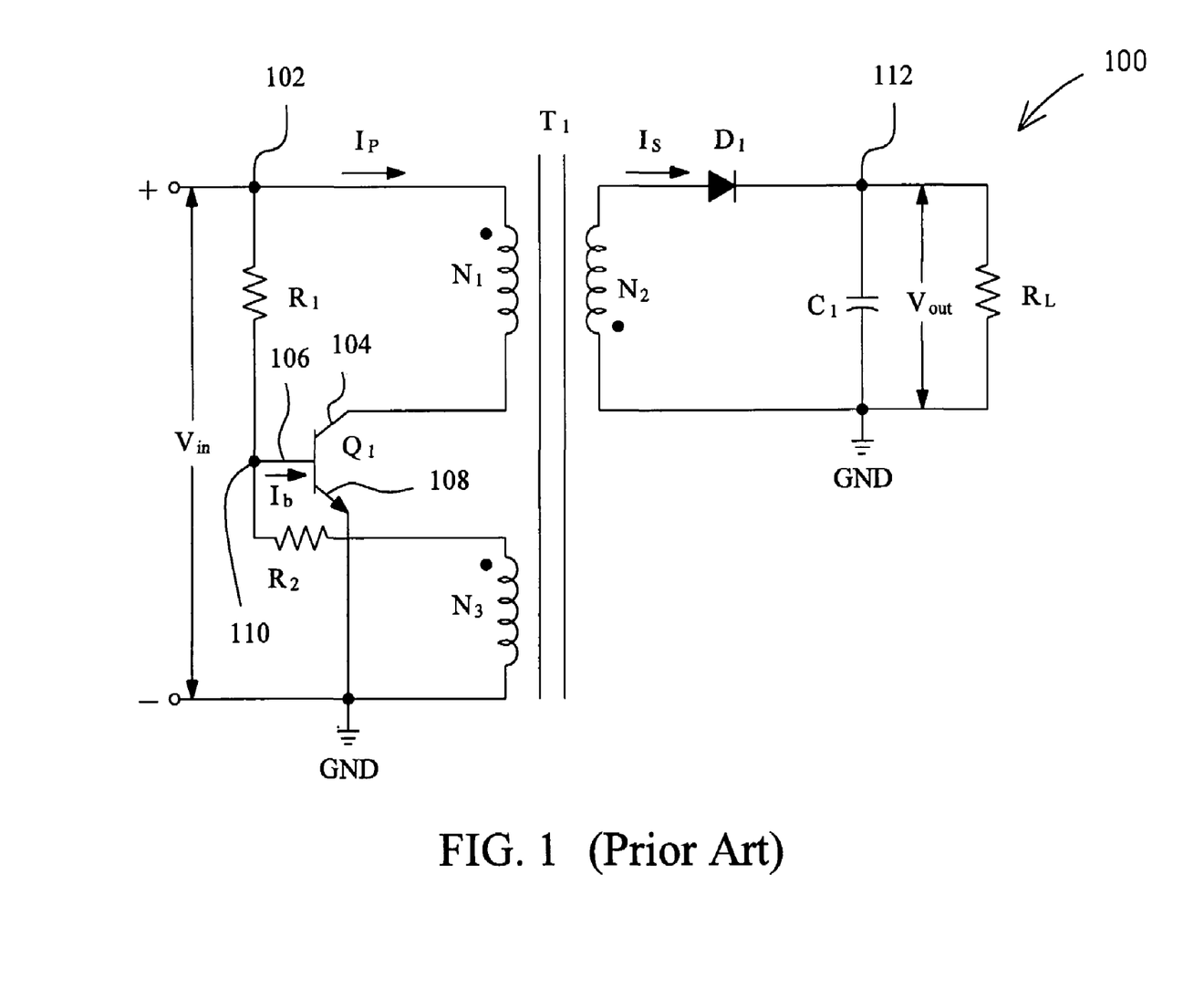
FIG. 1 shows a diagram of a conventional capacitor charger implemented with RCC circuit.

Portable apparatus is more and more popular, and therefore capacitor charger it uses receives more attentions than ever. FIG. 1 shows a diagram of a conventional capacitor charger 100 implemented with ring choke converter (RCC) circuit, in which a transformer T1 connected with an input voltage $V_{in}$ transforms a primary current $I_P$ to a secondary current $I_S$ that flows through a diode D1 to charge a capacitor C1 to generate an output voltage $V_{out}$ at the output 112 of the charger 100 to supply for a load $R_L$. To control the current $I_P$ or $I_S$, a power transistor Q1 has its collector 104 and emitter 108 connected to the primary winding N1 of the transformer T1 and ground, respectively, and resistors R1 and R2 are connected between the input 102 of the charger 100 and another primary winding N3 of the transformer T1 for the bias to the base of the transistor Q1. Although the capacitor charger 100 is cheaper, the transformer T1 has a more complicated structure to construct the circuit, and the power transistor Q1 causes higher switching loss. In addition, there are too many parameters effective to the current $I_P$, for example the input voltage $V_{in}$, transformer T1 and power transistor Q1, for the current $I_P$ to be precisely controlled. Furthermore, the maximum of the current $I_P$ has to be set much smaller than the base current $I_b$ of the power transistor Q1, and much longer charging time is thus needed.

Figure 2:
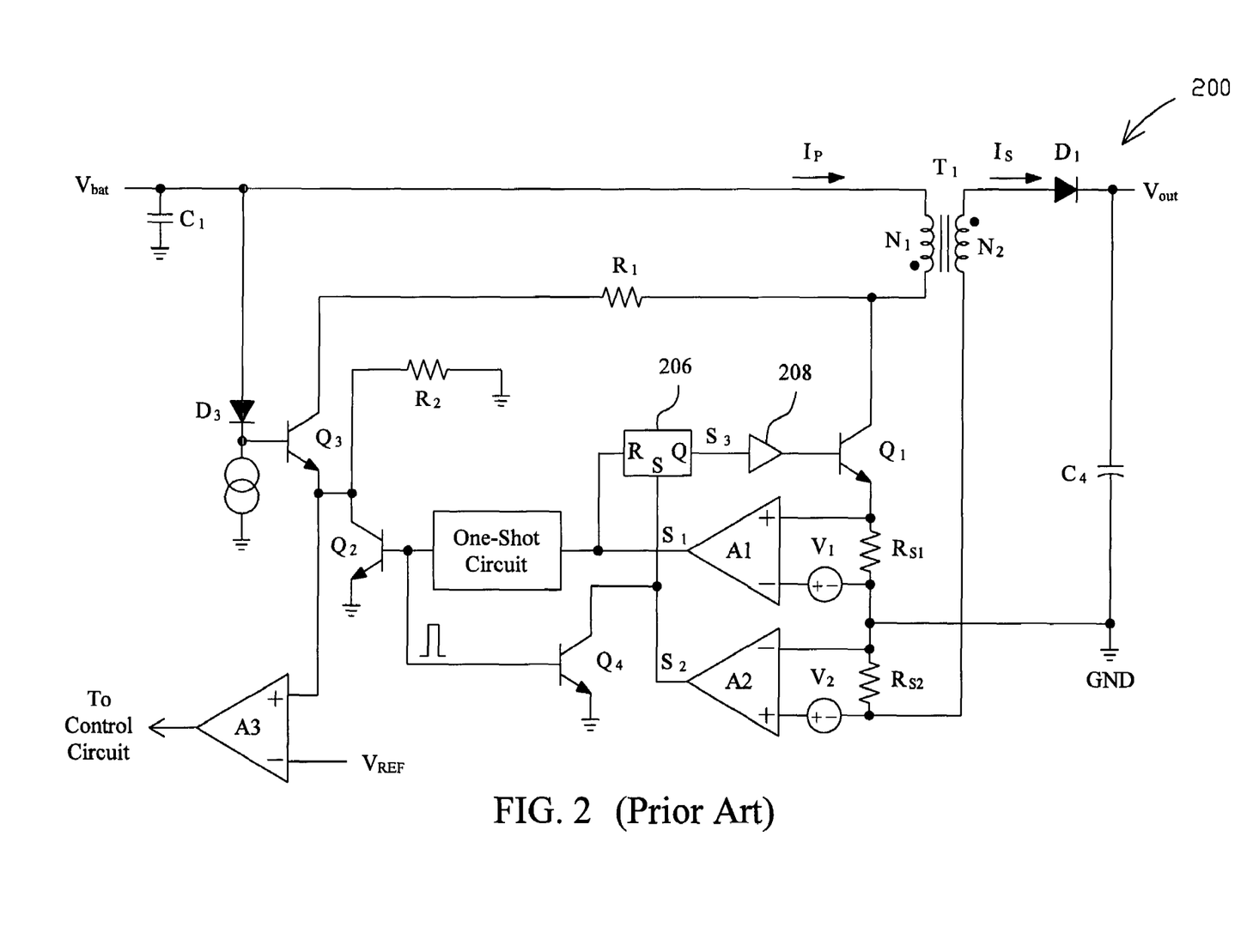
FIG. 2 shows a diagram of another conventional capacitor charger.

FIG. 2 shows a diagram of another conventional capacitor charger 200, in which a transformer T1 connected with a battery voltage $V_{bat}$ transforms a primary current $I_P$ to a secondary current $I_S$ to charge a capacitor C4 for generating an output voltage $V_{out}$. To control the current $I_P$ or $I_S$, a current sense resistor $R_S1$ is connected between a transistor Q1 and ground, another current sense resistor $R_S2$ is connected between the secondary winding N2 of the transformer T1 and ground, and operational amplifiers A1 and A2 are used to amplify the voltage drops across the resistors R1 and R2 to generate detector signals S1 and S2 for the inputs R and S of a flip-flop 206, respectively, so as to generate a switch signal S3 for switching the transistor Q1 through a driver 208. In the capacitor charger 200, the primary current $I_P$ and secondary current $I_S$ of the transformer T1 are directly detected by the current sense resistors $R_S1$ and $R_S2$ to determine the maximum and minimum of the primary current $I_P$. However, for not affecting the operations of the charger 200, only much small resistors can be used for the current sense resistors $R_S1$ and $R_S2$, and therefore the voltage drops across the resistors $R_S1$ and $R_S2$ are very small. As a result, the currents flowing through the resistors $R_S1$ and $R_S2$ cannot be precisely detected, and it is also easily to introduce spikes on the primary current $I_P$ out of the maximum current that the battery could supply for the charger 200. Furthermore, the charging current $I_P$ of the charger 200 is not easy to set.

Figure 3:
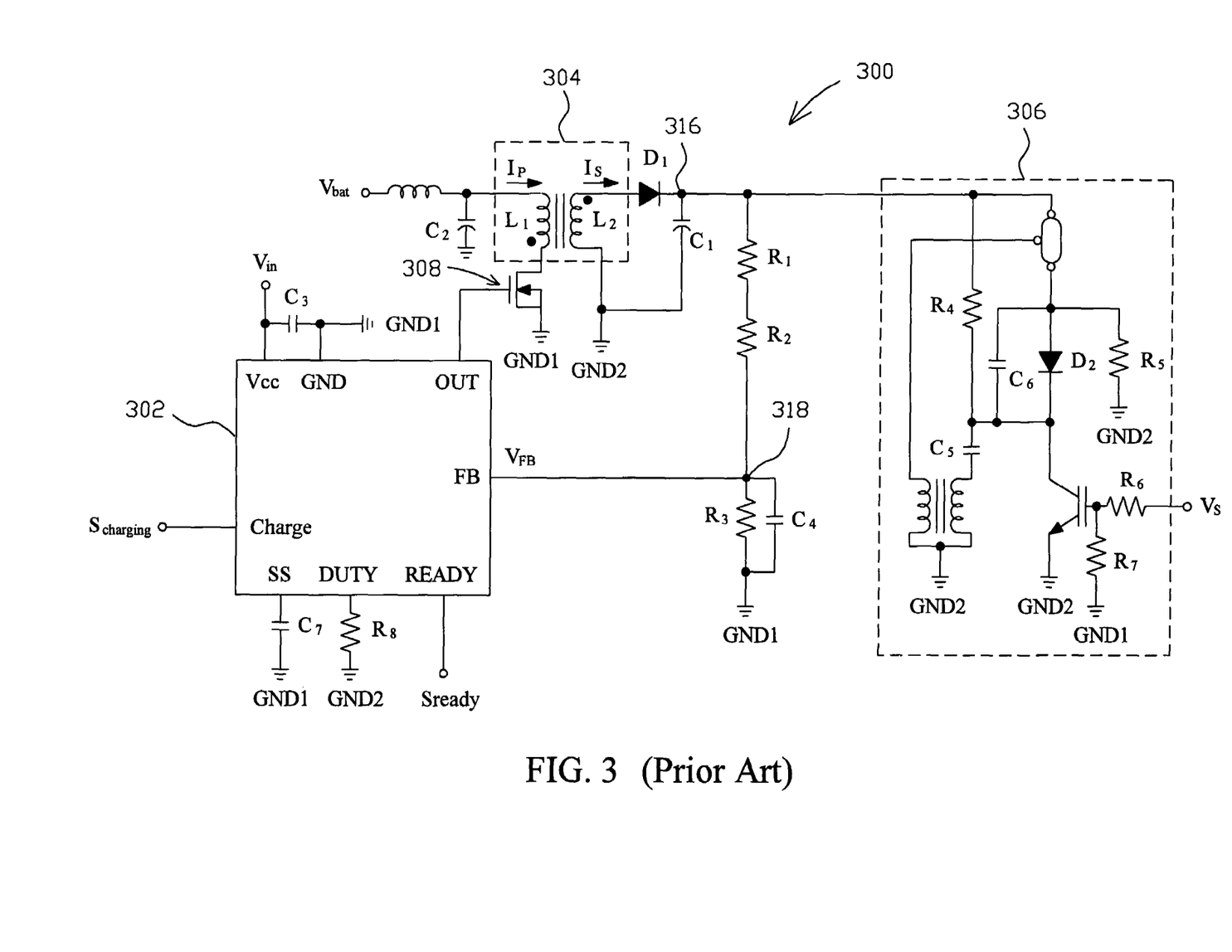
FIG. 3 shows an application of yet another conventional capacitor charger for a flash lamp module.

FIG. 3 shows an application of yet another conventional capacitor charger 300 for a flash lamp module 306, in which a transformer 304 has a primary winding L1 connected between an input voltage $V_{bat}$ and a transistor 308 to transform the primary current $I_P$ to a secondary current $I_S$ by switching the transistor 308, so as to charge a capacitor C1 for supplying to the flash lamp module 306. To control the charging current $I_S$, resistors R1, R2 and R3 are connected in series between the output 316 of the charger 300 and ground to detect the voltage on the capacitor C1 by voltage dividing to provide a feedback signal $V_{FB}$ to a controller integrated circuit chip 302, so as to stop charging the capacitor C1 when the voltage on the capacitor C1 reaches its threshold. In the capacitor charger 300, it is the maximum duty of the transistor 308 to be used to determine the charging current $I_P$, and unfortunately, which is easy to have the transformer T1 to be magnetically saturated and inefficiently operated. Moreover, the input voltage $V_{bat}$ is supplied by battery, and it will decade as time goes by, resulting in longer and longer charging time for the capacitor C1 to reach the same voltage.

SUMMARY OF THE INVENTION

One object of the present invention is to provide a control apparatus and method for a capacitor charger.

Another object of the present invention is to provide an apparatus and method for a capacitor charger without introducing power loss resulted from current detection.

Yet another object of the present invention is to provide an apparatus and method for a capacitor charger without having the transformer to be magnetically saturated.

In a capacitor charger using a transformer to transform a primary current to a secondary current to charge a capacitor and a switch connected in series with the primary winding of the transformer to switch the primary current, according to the present invention, a control apparatus and method are used to adjust the on-time period of the switch depending on the input voltage connected to the capacitor charger. Preferably, the control apparatus includes a voltage generator to provide a voltage varying with the input voltage for the control apparatus to determine the on-time period for the switch. Preferably, the voltage provided by the voltage generator is supplied to a current source to generate a reference current that is mirrored by a current mirror to a charge/discharge circuit to generate a charged voltage for a comparator to compare with a reference voltage to generate a comparison signal, and on-time control logics is preferably included in the control apparatus to determine the on-time period of the switch in response to the comparison signal.

From one aspect of the present invention, it is easy to determine and set the delta current flowing through the primary or secondary winding of the transformer, thereby achieving simple and precise control.

From another aspect of the present invention, the delta current of the primary winding of the transformer is independent of the input voltage connected to the primary winding, thereby preventing the transformer from magnetic saturation.

From still another aspect of the present invention, there are no current sense resistors connected in series to the current path of the primary or secondary winding of the transformer, thereby introducing no power loss resulted therefrom.

According to the present invention, the on-time period of the switch varies with the input voltage, and therefore the influence to the delta current of the primary current resulted from the variation of the input voltage is eliminated, resulting in the delta current of the charging current could be a constant value and easily to set. In addition, the secondary current could be precisely controlled due to the off-time control, and therefore, the maximum of the primary current and the minimum of the secondary current both could be controlled in a desired range, thereby no magnetic saturation occurred to the transformer. Moreover, no current sense to the primary winding of the transformer is used to determine the on-time period of the switch, and thus there will be no power loss resulted from current detection to be introduced.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
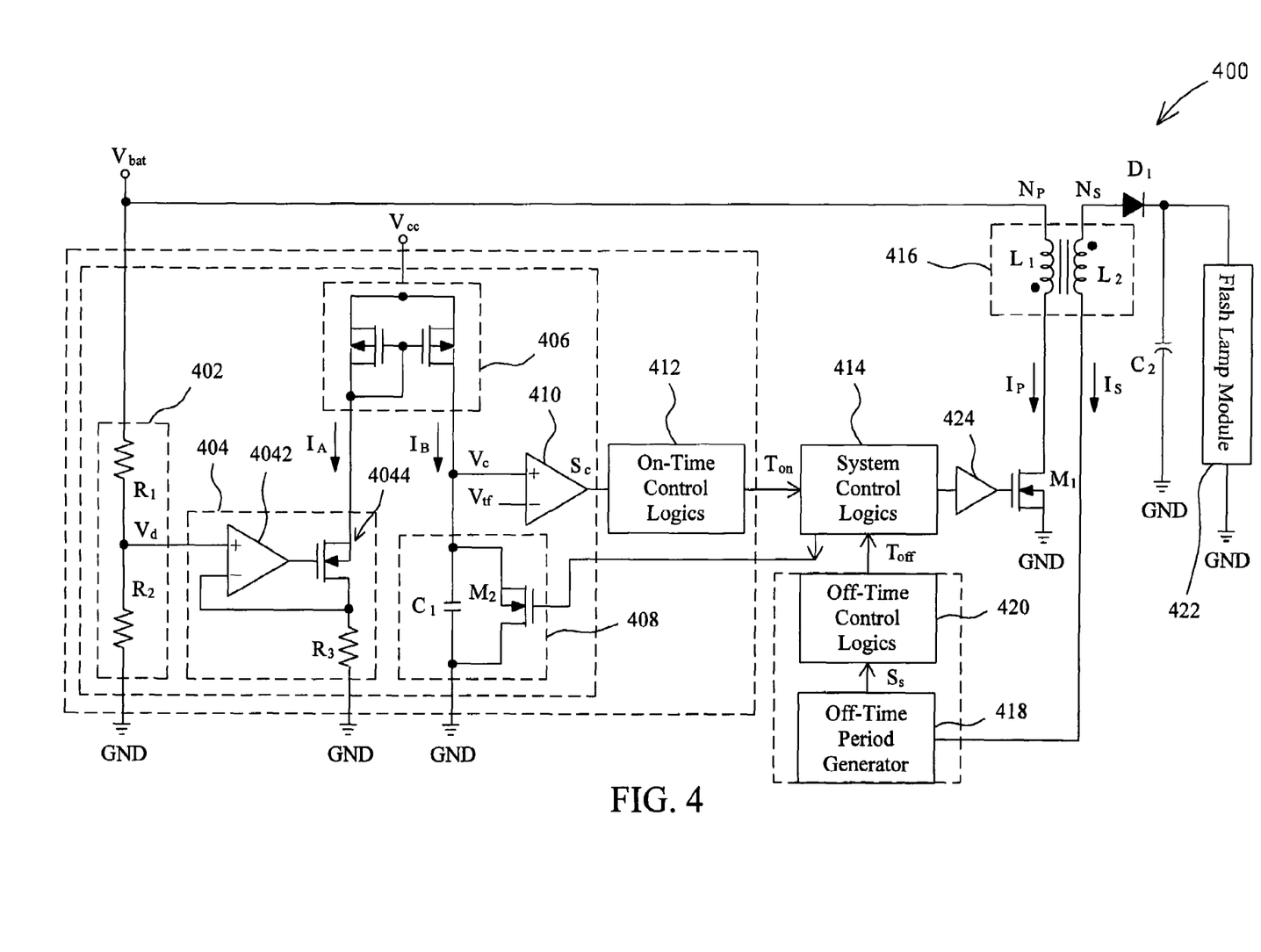
FIG. 4 shows an application of one embodiment according to the present invention for a flash lamp module.

FIG. 4 shows an application of one embodiment according to the present invention for a flash lamp module. In a capacitor charger 400, a transformer 416 has a primary winding L1 and a secondary winding L2 with a turns ratio $N_P:N_S$, a transistor M1 is connected between the primary winding L1 and ground GND, and the primary current $I_P$ flowing through the primary winding L1 is controlled by the switching transistor M1. Briefly, the capacitor charger 400 has system control logics 414 to switch the transistor M1 through a driver 424 in response to an on-time decision circuit and an off-time decision circuit. The on-time decision circuit includes on-time control logics 412 to determine the on-time period $T_{on}$ for the transistor M1 according to the output $S_C$ generated by an on-time period generator that includes a voltage generator 402, a current source 404, a current mirror 406, a charge/discharge circuit 408, and a comparator 410. On the other hand, the off-time decision circuit includes off-time control logics 420 to determine the off-time period $T_{off}$ for the transistor M1 according to the output $S_S$ generated by an off-time period generator 418. Systematically, neither the charging time nor the charging current is dependent of the battery voltage $V_{bat}$.

In the on-time period generator, the voltage generator 402 is connected with the input voltage $V_{bat}$ to generate a voltage $V_d$ varying with the input voltage $V_{bat}$. In this embodiment, as shown in FIG. 4, the voltage generator 402 includes a voltage divider composed of resistors R1 and R2 connected in series, and therefore provides the voltage $$V_d = V_{bat} \times \frac{R_2}{R_1 + R_2}. \qquad [\text{EQ-1}]$$

The current source 404 determines a current $I_A$ according to the voltage $V_d$. In this embodiment, the current source 404 includes a voltage-to-current converter that has a transconductive amplifier comprised of an operational amplifier 4042 and a transistor 4044 and a resistor R3 connected between the transistor 4044 and ground GND, in which the operational amplifier 4042 has a non-inverting input connected with the voltage $V_d$, an inverting input connected to the resistor R3, and an output connected to the gate of the transistor 4044. Due to the virtual ground between the inputs of the operational amplifier 4042, the voltage drop across the resistor R3 is also $V_d$, and thus determines the current $$I_A = \frac{V_d}{R_3}. \qquad [\text{EQ-2}]$$

From the equations EQ-1 and EQ-2, it is obtained the current $$I_A = V_{bat} \times \frac{R_2}{R_1 + R_2} \times \frac{1}{R_3}. \qquad [\text{EQ-3}]$$

The current $I_A$ provided by the current source 404 is used as the reference current for the current mirror 406 to generate a mirror current $I_B$ by mirroring the reference current $I_A$ supplied to the charge/discharge circuit 408. Since the reference current $I_A$ and the mirror current $I_B$ have the same magnitude, they are $$I_B = I_A = V_{bat} \times \frac{R_2}{R_1 + R_2} \times \frac{1}{R_3}. \qquad [\text{EQ-4}]$$

The charge/discharge circuit 408 includes a capacitor C1 and a transistor M2 serving as a switch shunt to the capacitor C1. The current $I_B$ charges the capacitor C1 to generate a charged voltage $V_C$ that is compared with a reference voltage $V_{tf}$ by the comparator 410 to generate the comparison signal $S_C$ for the on-time control logics 412 to determine the on-time period $$T_{on} = \frac{C_1 \times V_{tf}}{I_B}. \qquad [\text{EQ-5}]$$

From the equations EQ-4 and EQ-5, it is obtained the on-time period $$T_{on} = \frac{C_1 \times V_{tf} \times R_3 \times (R_1 + R_2)}{V_{bat} \times R_2}. \qquad [\text{EQ-6}]$$

In the off-time decision circuit, the off-time period generator 418 generates the signal $S_S$ according to the secondary current $I_S$, and thus the off-time control logics 420 could determine the off-time period $T_{off}$ supplied to the system control logics 414. Based on the on-time period $T_{on}$ and the off-time period $T_{off}$, the system control logics 414 could switch the transistor M1 by the driver 424 to control the primary current $I_P$, and moreover, reset the capacitor C1 by turning on the transistor M2 shunt to the capacitor C1 in the charge/discharge circuit 408.

The transformer 416 has the primary current $$I_P = V_{bat} \times T_{on} = L_1 \times \Delta I_P, \qquad [\text{EQ-7}]$$

where $\Delta I_P$ is the delta current, i.e., the difference between the maximum and minimum, of the primary current $I_P$. It thus has the on-time period $$T_{on} = \frac{L_1 \times \Delta I_P}{V_{bat}}. \qquad [\text{EQ-8}]$$

From the equations EQ-6 and EQ-8, it is obtained the on-time period $$T_{on} = \frac{L_1 \times \Delta I_P}{V_{bat}} = \frac{C_1 \times V_{tf} \times R_3 \times (R_1 + R_2)}{V_{bat} \times R_2}, \qquad [\text{EQ-9}]$$

and thereby the delta current $$\Delta I_P = \frac{C_1 \times V_{tf} \times R_3 \times (R_1 + R_2)}{L_1 \times R_2}. \qquad [\text{EQ-10}]$$

From the equation EQ-10, it is shown that the delta current $\Delta I_P$ of the primary current $I_P$ in the transformer 416 is independent of the input voltage $V_{bat}$, and is determined by the device parameters R1, R2, R3, C1, $V_{tf}$, and L1.

Since the maximum $I_{Pmax}$ and minimum $I_{Pmin}$ of the primary current $I_P$ follow the relation $$I_{Pmax} = \Delta I_P + I_{Pmin}, \qquad [\text{EQ-11}]$$

and the transformer 416 has the transformation $$I_{Pmin} = \frac{N_S}{N_P} \times I_{Smin}, \qquad [\text{EQ-12}]$$

where $I_{Smin}$ is the minimum of the secondary current $I_S$, it is obtained the maximum of the primary current $$I_{Pmax} = \Delta I_P + \frac{N_S}{N_P} \times I_{Smin}. \qquad [\text{EQ-13}]$$

If the minimum $I_{Smin}$ of the secondary current $I_S$ is fixed, then it is only needed to set the delta current $\Delta I_P$ of the primary current $I_P$ for setting the maximum $I_{Pmax}$ of the primary current $I_P$ to prevent the transformer 416 from magnetic saturation. It is shown by the equation EQ-10 that the delta current $\Delta I_P$ of the primary current $I_P$ could be set by determining the device parameters of the resistors R1, R2 and R3, capacitor C1, inductor L1, and reference voltage $V_{tf}$, for example, by selecting the resistance of the resistor R3 to set the delta current $\Delta I_P$, and from the equation EQ-10 the resistor R3 has the resistance $$R_3 = \frac{\Delta I_P \times L_1 \times R_2}{C_1 \times V_{tf} \times (R_1 + R_2)}, \qquad [\text{EQ-14}]$$

or by selecting the capacitance of the capacitor C1 to set the delta current $\Delta I_P$ of the primary current $I_P$, and from the equation EQ-10 the capacitor C1 has the capacitance $$C_1 = \frac{\Delta I_P \times L_1 \times R_2}{V_{tf} \times R_3 \times (R_1 + R_2)}. \qquad [\text{EQ-15}]$$

Likewise, the secondary current $I_S$ of the transformer 416 has the maximum $$I_{Smax} = \frac{N_P}{N_S} \times I_{Pmax}, \qquad [\text{EQ-16}]$$

and together with the equation EQ-13, it is obtained the maximum of the secondary current $$I_{Smax} = \frac{N_P}{N_S} \Delta I_P \times I_{Smin}. \qquad [\text{EQ-17}]$$

Therefore, if the minimum $I_{Smin}$ of the secondary current $I_S$ is fixed, it could set the maximum $I_{Smax}$ of the secondary current $I_S$ by setting the delta current $\Delta I_P$ of the primary current $I_P$.

It is shown by the embodiment 400 that the delta current $\Delta I_P$ of the primary current $I_P$ of the transformer 416 is determined by the resistors R1, R2 and R3, capacitor C1, inductor L1 and reference voltage $V_{tf}$, and therefore, it is easy to set the delta current $\Delta I_P$ and the maximum $I_{Pmax}$ of the primary current $I_P$ by selecting these parameters for not having the transformer 416 magnetically saturated.

Figure 5:
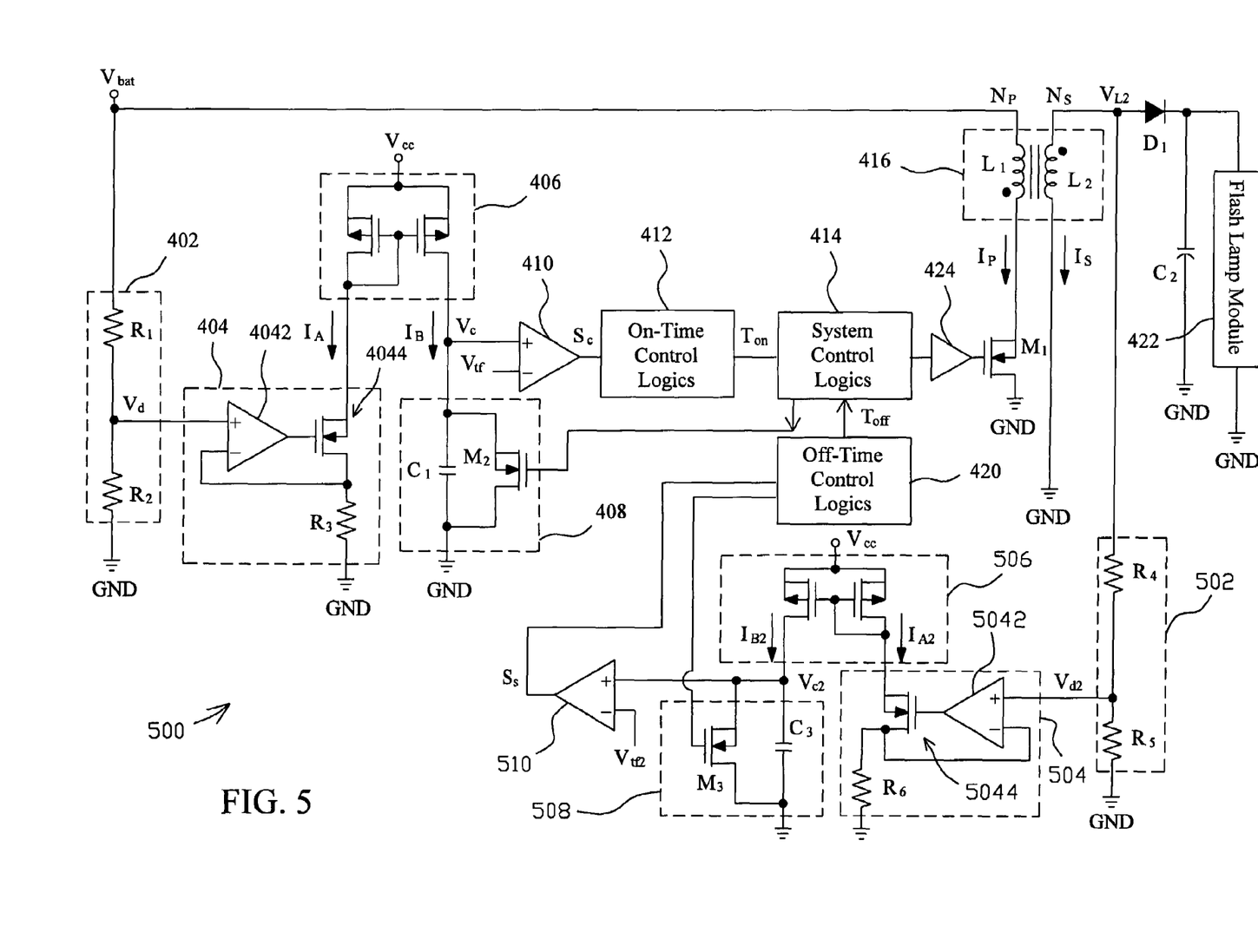
FIG. 5 shows an application of another embodiment according to the present invention for a flash lamp module.

FIG. 5 shows an application of another embodiment according to the present invention for a flash lamp module. In a capacitor charger 500, the basic architecture and the on-time decision circuit of the capacitor charger 400 shown in FIG. 4 are employed likewise, and the same numerals for those corresponding elements are also designated hereto. While to generate the signal Ss, a voltage generator 502 composed of resistors R4 and R5 is connected between the secondary voltage $V_L2$ and ground GND to generate a voltage $V_d2$ varying with the secondary voltage $V_L2$ as $$V_{d2} = V_{L2} \times \frac{R_5}{R_4 + R_5}. \qquad [\text{EQ-18}]$$

A current source 504 determines a current $I_A2$ according to the voltage $V_d2$. In the embodiment, the current source 504 includes a voltage-to-current converter that has a transconductive amplifier comprised of an operational amplifier 5042 and a transistor 5044 and a resistor R6 connected between the transistor 5044 and ground GND, in which the operational amplifier 5042 has a non-inverting input connected with the voltage $V_d2$, an inverting input connected to the resistor R6, and an output connected to the gate of the transistor 5044. Due to the virtual ground between the inputs of the operational amplifier 5042, the voltage drop across the resistor R6 is $V_d2$, and thus determines the current $$I_{A2} = \frac{V_{d2}}{R_6}. \quad [\text{EQ-19}]$$

From the equations EQ-18 and EQ-19, it is obtained the current $$I_{A2} = V_{L2} \times \frac{R_5}{R_4 + R_5} \times \frac{1}{R_6}. \quad [\text{EQ-20}]$$

The current $I_A2$ provided by the current source 504 is used as the reference current for a current mirror circuit 506 to generate a mirror current $I_B2$ by mirroring the reference current $I_A2$ supplied to the charge/discharge circuit 508. Since the reference current $I_A2$ and the mirror current $I_B2$ have the same magnitude, they are $$I_{B2} = I_{A2} = V_{L2} \times \frac{R_5}{R_4 + R_5} \times \frac{1}{R_6}. \quad [\text{EQ-21}]$$

The charge/discharge circuit 508 includes a capacitor C3 and a transistor M3 serving as a switch shunt to the capacitor C3, and the transistor M3 is controlled by the off-time control logics 420. The current $I_B2$ charges the capacitor C3 to generate a charged voltage $V_C2$ that is compared with a reference voltage $V_{tf}2$ by a comparator 510 to generate a comparison signal Ss for the off-time control logics 420 to determine the off-time period $$T_{off} = \frac{C_3 \times V_{tf2}}{I_{B2}}. \quad [\text{EQ-22}]$$

From the equations EQ-21 and EQ-22, it is obtained the off-time period $$T_{off} = \frac{C_3 \times V_{tf2} \times R_6 \times (R_4 + R_5)}{V_{L2} \times R_5}, \quad [\text{EQ-23}]$$

and the off-time period is also $$T_{off} = \frac{L_2 \times \Delta I_S}{V_{L2}}. \quad [\text{EQ-24}]$$

By combining the equations EQ-23 and EQ-24, it is obtained the off-time period $$T_{off} = \frac{L_{21} \times \Delta I_S}{V_{L2}} = \frac{C_3 \times V_{tf2} \times R_6 \times (R_4 + R_5)}{V_{L2} \times R_5}, \quad [\text{EQ-25}]$$

and thereby the resistance $$R_6 = \frac{\Delta I_S \times L_2 \times R_5}{C_3 \times V_{tf2} \times (R_4 + R_5)}. \quad [\text{EQ-26}]$$

From the equation EQ-26, it is shown that the delta current $\Delta I_S$ of the secondary current in the transformer 416 is proportional to the resistance of the resistor R6, and by which it could set the output current of the secondary winding L2 in the transformer 416 by setting the resistance of the resistor R6.

To control the capacitor chargers 400 and 500 or to switch the switch M1, there is no current sense resistor connected in series to the windings L1 or L2 of the transformer 416, and therefore no power loss is introduced by the current sense resistors. The delta current $\Delta I_P$ of the primary current $I_P$ is easily to set and well controlled, and thus the transformer 416 could be prevented from magnetic saturation, thereby improving the efficiency thereof. The variation of the battery $V_{bat}$ is also used to adjust the on-time period of the switch M1, thereby optimizing the operations of the capacitor chargers 400 and 500 adaptive to the varied input voltage $V_{bat}$, and the charging time and charging current are independent of the battery voltage $V_{bat}$.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitor charger connected with an input voltage for generating an output voltage, the capacitor charger comprising:
   a switch;
   a transformer having a primary winding connected between the input voltage and the switch for generating a primary current flowing through the primary winding by switching the switch to thereby induce a secondary current flowing through a secondary winding of the transformer and a secondary voltage tapered from the secondary winding to further derive the output voltage, variation of the primary current in operable value remaining within a delta current parameter determined independent of the input voltage; and
   a control apparatus connected to the switch for adjusting an on-time period for the switch adaptively in response to the input voltage.

2. The capacitor charger of claim 1, wherein the control apparatus comprises:
   a voltage generator for providing a first voltage depending on the input voltage;
   a current source for providing a reference current depending on the first voltage;
   a current mirror for mirroring the reference current to thereby generate a minor current;
   a charge/discharge circuit connected with the mirror current for generating a second voltage; and
   a comparator for comparing the second voltage with a reference voltage to generate a comparison signal to further adjust the on-time period.

3. The capacitor charger of claim 2, wherein the voltage generator comprises a voltage divider connected with the input voltage for dividing the input voltage to thereby generate the first voltage.

4. The capacitor charger of claim 2, wherein the current source comprises;
a transistor having a drain for conducting the reference current;
an operational amplifier having a non-inverting input connected with the first voltage, an inverting input connected to a source of the transistor, and an output connected to a gate of the transistor; and
a resistor connected to the inverting input of the operational amplifier for setting the reference current.

5. The capacitor charger of claim 4, wherein the resistor has a resistance proportional to the delta current parameter determined for the primary current.

6. The capacitor charger of claim 2, wherein the charge discharge circuit comprises:
a capacitor for being charged by the mirror current to thereby generate the second voltage; and
a second switch shunt to the capacitor for resetting the capacitor.

7. The capacitor charger of claim 6, wherein the capacitor has a capacitance proportional to the delta current parameter determined for the primary current.

8. The capacitor charger of claim 6, further comprising system control logics connected to the second switch for turning on the second switch to thereby reset the capacitor.

9. The capacitor charger of claim 2, further comprising on-time control logics connected with the comparison signal to adjust the on-time period.

10. The capacitor charger of claim 1, wherein the control apparatus comprises an off-time period generator connected to the secondary winding of the transformer for generating an off-time period for the switch in response to the secondary current.

11. The capacitor charger of claim 10, wherein the control apparatus further comprises off-time control logics connected to the off-time generator for determining the off-time period.

12. The capacitor charger of claim 1, wherein the control apparatus comprises:
a voltage generator for providing a first voltage depending on the secondary voltage;
a current source for providing a reference current depending on the first voltage;
a current mirror for mirroring the reference current to thereby generate a mirror current;
a charge discharge circuit connected with the mirror current for generating a second voltage; and
a comparator for comparing the second voltage with a reference voltage to generate a comparison signal to further determine an off-time period.

13. The capacitor charger of claim 12, wherein the control apparatus further comprises off-time control logos connected with the comparison signal for determining the off-time period.

14. A control method for a capacitor charger having a primary winding of a transformer connected with an input voltage for generating an output voltage, the control method comprising the steps of:
switching a switch connected to the primary winding for generating a primary current flowing through the primary winding to thereby induce a secondary current flowing through a secondary winding of the transformer and a secondary voltage tapered from the secondary winding to further derive the output voltage;
maintaining variation of the primary current in operable value within a delta current parameter determined independent of the input voltage; and
adjusting an on-time period for the switch adaptively in response to the input voltage.

15. The control method of claim 14, the step of adjusting an on-time period comprises the steps of:
generating a first voltage depending on the input voltage;
generating a reference current depending on the first voltage;
mirroring the reference current for generating a mirror current;
charging a capacitor with the mirror current for generating a second voltage; and
comparing the second voltage with a reference voltage for generating a comparison signal to further adjust the on-time period.

16. The control method of claim 15, further comprising selecting a capacitance of the capacitor proportional to the delta current parameter determined for the primary current.

17. The control method of claim 15, wherein the step of generating a first voltage comprises dividing the input voltage for generating the first voltage.

18. The control method of claim 15, wherein the step of generating a reference current comprises generating the reference current proportional to the first voltage.

19. The control method of claim 15, further comprising resetting the capacitor.

20. The control method of claim 14, further comprising the steps of:
generating a first voltage depending on the secondary voltage;
generating a reference current depending on the first voltage;
mirroring the reference current for generating a mirror current;
charging a capacitor with the minor current for generating a second voltage; and
comparing the second voltage with a reference voltage for generating a comparison signal to further determine an off-time period for the switch.

* * * * *